United States Patent [19]
Standlick

[11] 3,802,605
[45] Apr. 9, 1974

[54] FLOW COMPENSATING METERING UNIT
[75] Inventor: Ronald E. Standlick, Warren, Mich.
[73] Assignee: Ciba-Geigy Corporation, Ardsley, N.Y.
[22] Filed: Oct. 8, 1971
[21] Appl. No.: 187,735

[52] U.S. Cl. ............................... 222/134, 137/100
[51] Int. Cl. .............................................. B67d 5/60
[58] Field of Search .................... 222/134, 135, 504; 137/636, 100; 92/76; 417/540; 259/4

[56] References Cited
UNITED STATES PATENTS

| | | | |
|---|---|---|---|
| 3,043,477 | 7/1962 | Trumbull et al. | 222/134 X |
| 3,242,945 | 3/1966 | Nash | 137/636 X |
| 2,773,455 | 12/1956 | Mercier | 417/540 |
| 3,178,157 | 4/1965 | Cole | 259/4 |
| 3,246,808 | 4/1966 | Lidell et al. | 222/504 X |
| 3,044,480 | 7/1962 | Shih-Ying Lee | 137/636 X |
| 2,125,262 | 7/1938 | Hennecke | 92/76 X |
| 2,883,996 | 4/1959 | Blewett et al. | 137/100 |
| 2,291,229 | 7/1942 | Johnson | 137/100 |

*Primary Examiner*—Robert B. Reeves
*Assistant Examiner*—Joseph J. Rolla
*Attorney, Agent, or Firm*—Miller, Morriss, Pappas & McLeod

[57] ABSTRACT

A metering, mixing and dispensing apparatus having a compensator metering assembly for providing proportionate flow of materials by mechanically compensating for changes in pressures of materials being dispensed therethrough. The compensator metering assembly is provided with a pair of material chambers having valve means proximate to discharge orifice outlets provided therein. The valve means are mechanically interconnected so that a change in orifice opening in one chamber due to change of material pressure is mechanically transmitted to the valve means in the other chamber so that a corresponding change in orifice size is effected so as to maintain equal pressures across the discharge orifice outlets, thus maintaining the desired predetermined equal or proportionate flow of the materials therethrough.

9 Claims, 4 Drawing Figures

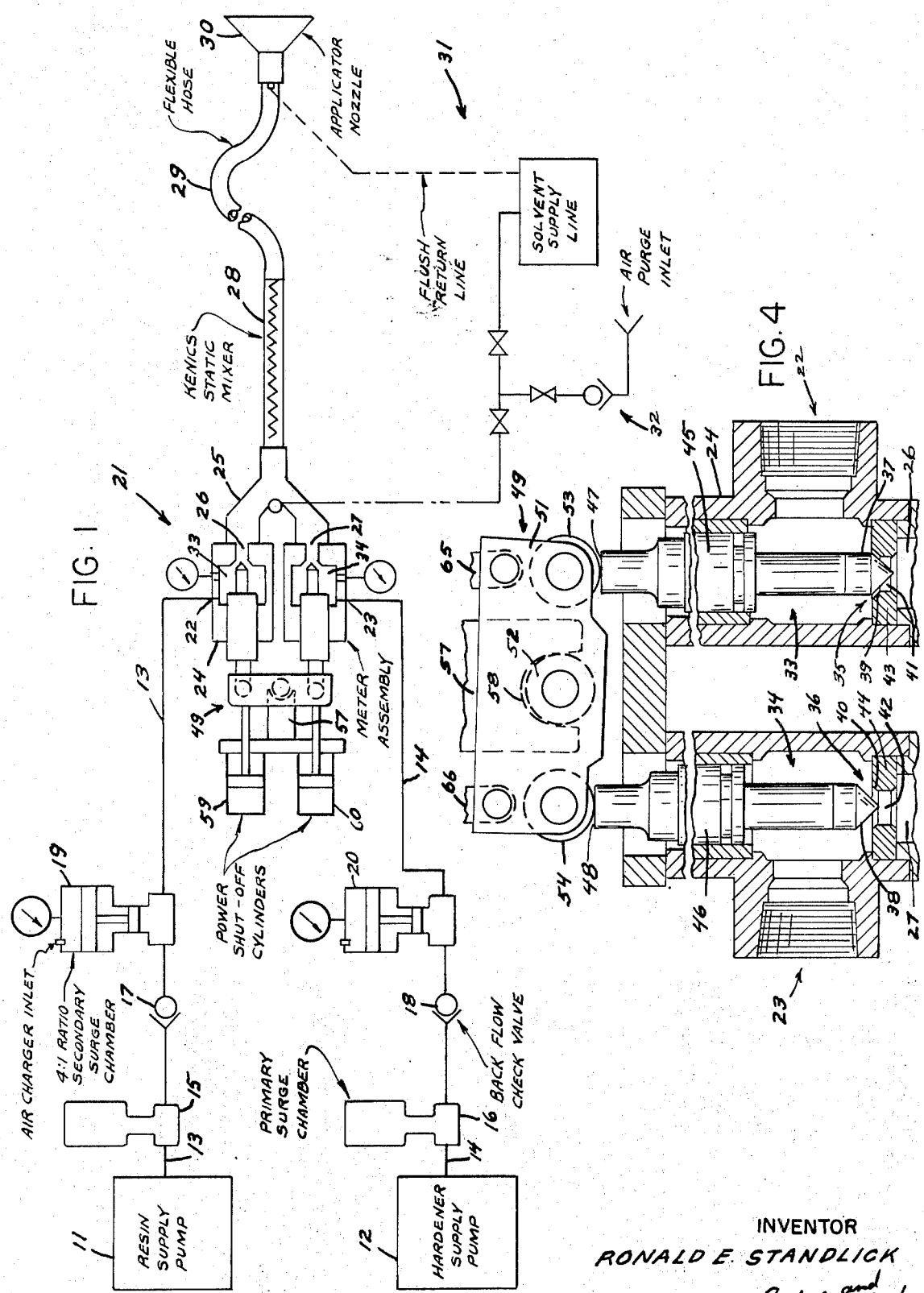

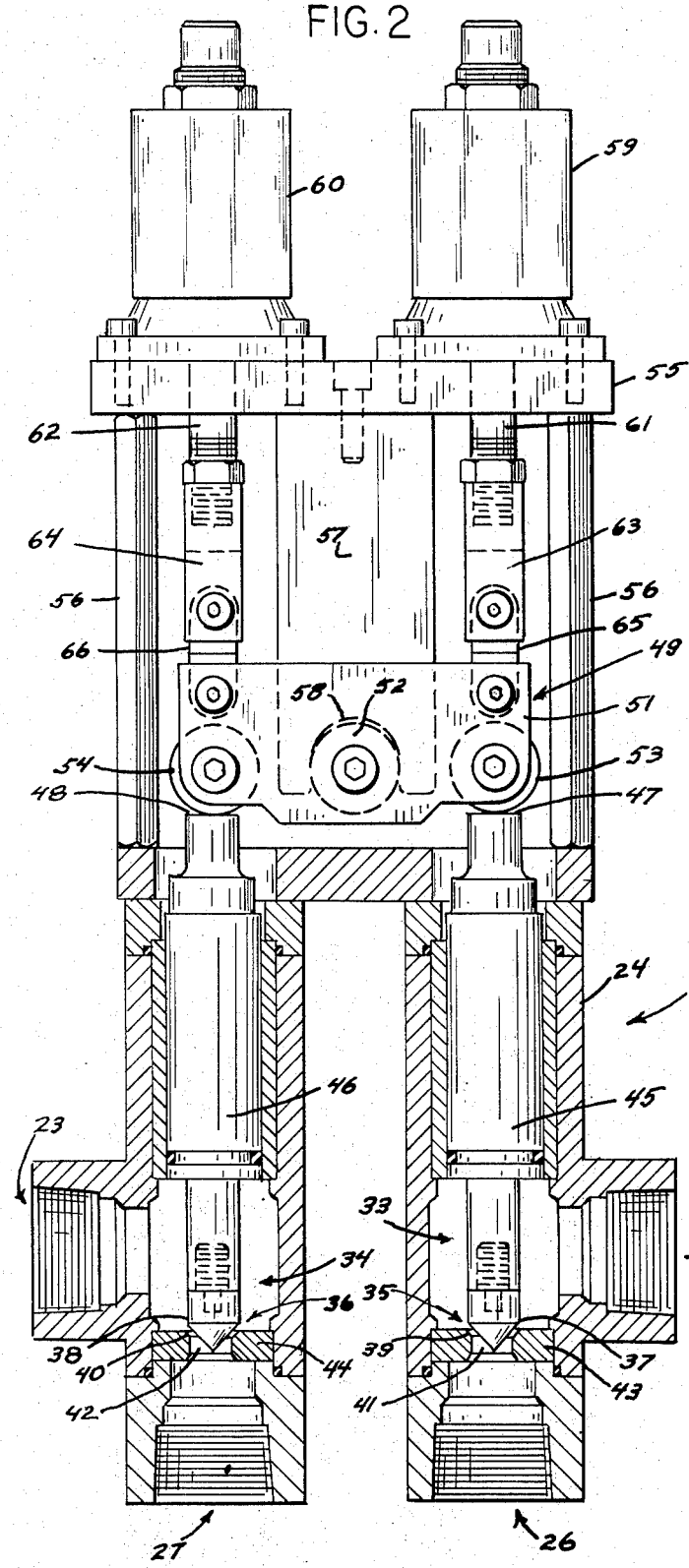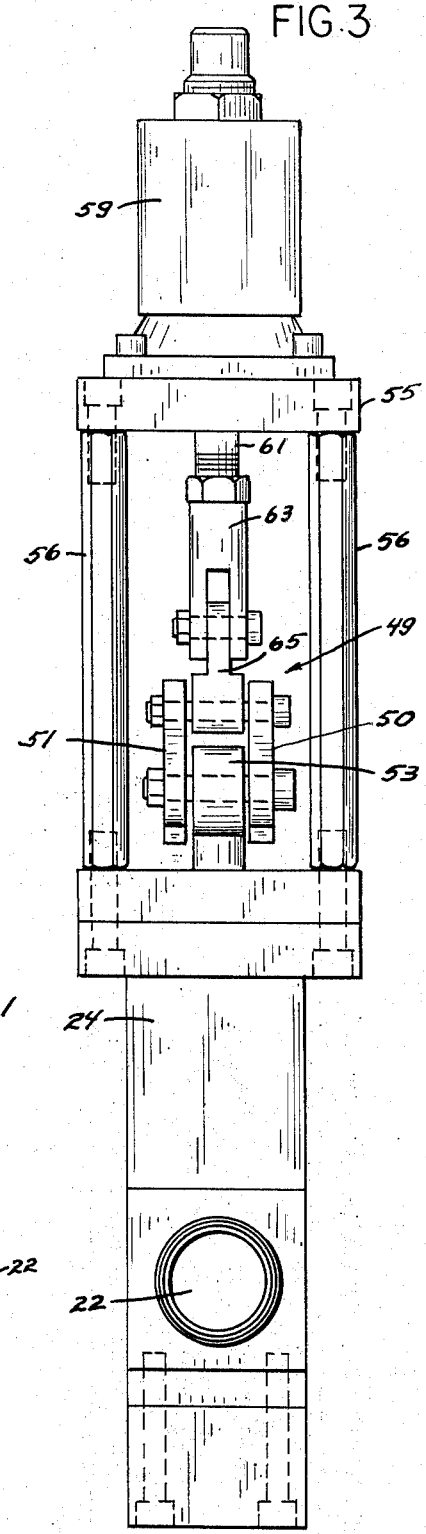

FLOW COMPENSATING METERING UNIT

SUMMARY OF THE INVENTION

The invention relates to a metering, mixing and dispensing apparatus whereby two viscous or fluid materials can be dispensed in predetermined proportionate amounts and rates through orifices having valves which are mechanically interconnected so that the size of each orifice changes in relation to the other so as to compensate for changes in pressure, temperature and viscosity of each material being dispensed.

PRIOR ART

While devices in the prior art recognize the fixed orifice metering principle which states in part that a fluid will flow proportional to an orifice if the pressure drop is maintained constant across the orifice, none of the devices of the known prior art show the use of a compensator metering assembly whereby two separate materials are delivered to the inlet ports of a compensator metering unit which dispenses the materials in the desired proportion regardless of pressure changes in each material. Representative of the prior art devices are Collins et al. U.S. Pat. No. 1,290,513, Waugh U.S. Pat. No. 3,116,749, Wasson U.S. Pat. No. 3,116,748, Gallagher U.S. Pat. No. 2,277,314, Leigh U.S. Pat. No. 1,919,234 and Schneider U.S. Pat. No. 2,788,953. In general, the mixing devices of the prior known art are primarily intended to mix identical liquids while compensating solely for temperature variations. They are not intended or capable of handling materials of different viscosities, such as paste-like compounds. Nowhere in the prior art is there shown the use of a simple compensator metering assembly such as the present invention whereby pressure compensating means are utilized to maintain proportionate rates of flow of material of different viscosities.

OBJECTS

It is therefore an object of this invention to provide a metering, mixing and dispensing apparatus having a compensator metering assembly whereby predetermined proportionate flow of materials is maintained regardless of changes in pressure of either material.

Another object of this invention is to provide a flow compensating metering unit having two interconnected discharge orifice valve means whereby any change in either material pressure is mechanically transmitted to the opposite orifice valve means so as to make a corresponding change in the size of the orifice valve opening, thus maintaining equal pressures across the orifice openings.

Yet another object of this invention is to provide a flow compensating metering unit which can mechanically compensate by making corresponding changes in valve openings so as to achieve equal flow of materials through discharge orifice openings regardless of changes in pressure, temperature and/or viscosity in either or both of the materials involved.

A still further object of this invention is to provide a metering, mixing and dispensing apparatus which is simple and rugged in design and which is capable of handling materials of different viscosities, such as paste-like compounds.

Other objects and advantages found in the construction of the invention will be apparent from a consideration of the following specification in connection with the appended claims and the accompanying drawings.

In the drawings:

FIG. 1 is a schematic drawing of the metering, mixing and dispensing apparatus showing the flow compensating metering assembly.

FIG. 2 is a front elevation view of the flow compensating metering assembly showing the orifice needle valves and the pivotal mechanical interconnection thereof.

FIG. 3 is a side elevation view of the flow compensating metering assembly.

FIG. 4 is a schematic view showing the relative valve opening size interrelationship when compensations are being made to maintain the desired equal or proportionate flow of material through the flow compensating metering apparatus.

GENERAL DESCRIPTION

In general, a metering, mixing and dispensing apparatus is provided for the proportioning of a two-component material such as a resin and a hardener. The apparatus utilizes a flow compensating metering assembly whose design is based on the "fixed orifice" metering principle which states in part that a fluid will flow proportional to the size of an orifice, if the pressure drop is maintained constant across the orifice.

The metering, mixing and dispensing apparatus utilizes a pair of material supply means (a resin supply pump and a hardener supply pump) which deliver the two separate materials through separate conduits to separate material chambers provided in the flow compensator metering unit. Each of the material chambers is provided with material receiving inlet means which are connected to the material conduits. A discharge outlet is provided in each of the material chambers so that metered material can be selectively dispensed therefrom. Valve means are provided in each of the material chambers at each of the discharge outlet openings. Each of the valve means are mounted on slidable compensator housing piston rod members which are mechanically interconnected so a change in the size of one valve opening results in a corresponding and opposite change in the size of the other valve opening. Thus, a change in either material pressure is mechanically transmitted to the opposite orifice, thus maintaining equal pressures across the orifice outlets. This results in the automatic maintaining of the desired equal or proportionate flow of the materials from the compensator metering unit regardless of changes due to pump pressures, temperature and viscosity of the individual materials.

The two materials are then introduced into mixer means for mixing prior to use. In one embodiment of the invention, the mixed material is directed through a flexible applicator hose which is provided with an applicator nozzle for applying the material into its final use position.

SPECIFIC DESCRIPTION

As shown in FIG. 1, a resin supply pump 11 and a hardener supply pump 12 are provided to move the materials through the system. The pumps are standard air operated reciprocating pumps of the double action chopping check type which are available on the market. Other types of pumps or pressure supply containers can be utilized for specific applications as required.

The pumps, 11 and 12, are connected to material conduits 13 and 14, respectively.

Primary surge chambers 15 and 16, respectively, are provided in each conduit to prevent fall-off of pressure when the pumps change stroke direction. Such pressure surge compensating chambers are well known in the art and will not be described herein.

Back-flow check valves 17 and 18, respectively, are also provided to insure proper direction of flow through the system. Such valves are well known in the art and will not be discussed herein.

Secondary surge chambers or accumulators, 19 and 20, are provided in the lines so as to achieve more fine control over pulsations which might occur in the lines. The air charge of the accumulators is determined at the time of the machine set up and, in the preferred embodiment of the apparatus, they are set at a 4:1 ratio. The main purpose of the accumulators is to provide a non-pulsating even flow to the flow compensating metering unit 21. The use of such surge chambers or accumulators is well known in the art and will not be discussed herein.

As further shown schematically in FIG. 1, the material conduits 13 and 14 are connected to the flow compensating metering assembly 21 through inlet openings, 22 and 23, respectively, which are provided in the compensator metering housing 24. The flow compensating metering assembly as shown in FIGS. 2, 3 and 4 will be discussed hereinafter in greater detail.

A Y-connector conduit or manifold 25 is connected to discharge outlets 26 and 27 provided in the compensator metering housing 24 so as to receive metered material therefrom in the desired predetermined ratio. When the two metered materials come together in the Y-manifold 25, a common back pressure condition is achieved. This further stabilizes the pressure across the discharge orifices, thereby providing for more stable operation of the flow compensating metering unit.

A Kenics static mixing tube 28 or any other type of mechanical or flow-through mixer is connected to the Y-connector conduit 25 so as to receive and suitably mix the metered material. A flexible applicator hose 29 having an applicator nozzle 30 is connected to the mixer tube 28 so as to convey the mixed material therefrom to its end use position. However, if desired, the metered materials can be further processed and used without utilization of the specific mixer and applicator structures shown and described herein.

As further shown in FIG. 1, a solvent flushing system 31 is incorporated into the mixer and applicator apparatus to permit cleaning of the mixer tube 28 and applicator hose 29. A commercially available air-operated solvent pump (not shown) is provided to circulate the solvent cleaner through the mixer and applicator assemblies until the cleaning action has been completed. An air purge system 32 is also provided so as to add turbulence to the solvent, thereby enhancing the cleaning action.

In the embodiment of the invention in the drawings, all of the pumps, shut-off cylinders, flush and purge systems, and surge chambers are primarily air-operated. Suitable air supply and control devices are provided as necessary to operate the entire system. Such air supply and control systems and devices are well known in the art and are not shown or described herein.

As shown in FIGS. 2 and 3, the flow compensating metering assembly 21 is provided with a compensator meter housing 24 having material receiving chambers 33 and 34. The chambers 33 and 34 are provided with material receiving inlet means or openings, 22 and 23, and discharge outlets, 26 and 27, respectively.

Valve means 35 and 36 are provided in chambers 33 and 34. The valve means comprise needle valves 37 and 38 and valve seats 39 and 40, respectively. The needle valves 37 and 38 are cylindrical and have a tapered end point or cone which matingly engage the valve seats 39 and 40, respectively. Each of the valve seats 39 and 40 define a circular orifice or opening 41 and 42 in the orifice plates 43 and 44, respectively. The valve seats 39 and 40 form bevel surfaces which have the same slope as the slope of the end cone of each of the needle valve members 37 and 38 so as to provide for selective mating engagement of the needle valves and valve seats. Thus, when the needle valves selectively engage the valve seats, the valve means 35 and 36 are closed and material in the chambers 33 and 34 does not pass through the openings 41 and 42 in the orifice plates 43 and 44.

The needle valves 37 and 38 are mounted on compensator housing piston rods, 45 and 46, respectively, which extend outwardly through the compensator housing 24 and have flat cam follower end surfaces, 47 and 48, respectively.

A pivotally mounted connector bearing plate assembly 49 is provided which consists of two parallel spaced-apart bearing plates 50 and 51 which have a central pivot roller 52 mounted therebetween. The bearing plate assembly 49 is also provided with cam rollers 53 and 54 which are positioned at the ends thereof so as to be in selective operative cam engagement with the cam follower end surfaces 47 and 48, respectively, of the compensator housing piston rods 45 and 46.

A cylinder mounting plate 55 is provided on said compensator housing 24 in a fixed parallel spaced-apart relationship therefrom. The cylinder mounting plate 55 is supported in this position by support members 56. The cylinder mounting plate 55 is provided with centrally positioned pivot plate 57 which extends downwardly toward the bearing plate assembly 49 which is positioned intermediate the cylinder mounting plate 55 and the cam follower end surfaces 47 and 48 of the compensator housing piston rods 45 and 46.

The pivot plate 57 is provided with a cam yoke surface 58 which is in selective cam operative engagement with the central pivot roller 52 of the bearing plate assembly 49. Thus positioned, the bearing plate assembly 49 is pivotal about the pivot plate 57 in response to corresponding movement of the compensator housing piston rods, 45 and 46.

A pair of power shut-off air cylinders 59 and 60 are provided on the cylinder mounting plate 55. The power shut-off air cylinders 59 and 60 are provided with cylinder piston rods 61 and 62, respectively, which extend toward and are in co-axial alignment with the corresponding compensator housing piston rod members, 45 and 46. Clevis members 63 and 64 are provided on the cylinder piston rod members 61 and 62, respectively. The clevis members 63 and 64 are connected to the bearing plate assembly 49 by connector linkage members 65 and 66, respectively.

As previously described, the materials being metered are conveyed to the flow compensating meter assembly 21 through conduits 13 and 14. In the preferred embodiment of the invention shown and described herein, the materials being metered, mixed and dispensed are a resin and a hardener. However, other types of materials can be utilized as desired. The respective materials enter the material chambers 33 and 34, respectively, through inlet openings 22 and 23 to which the conduits 13 and 14 are connected.

In operation, the power shut-off cylinders 59 and 60 of the flow compensating meter assembly 21 are exhausted. The pressure of the materials entering both chambers 13 and 14 pushes the compensator housing piston rods 45 and 46 outwardly. This movement opens the valve means 35 and 36 by moving the cone of each needle valve 37 and 38 away from its respective valve seats 39 and 40, thereby permitting controlled movement of the materials from the respective chambers 33 and 34 through the orifice openings 41 and 42 in the orifice plates 43 and 44 and subsequently out through the discharge outlets 26 and 27.

As a result of the foregoing movement, the bearing plate assembly 49 is also moved into operative contact with the pivot plate 57, wherein the central pivot roller 52 of the bearing plate assembly 49 engages the yoke portion 58 of the pivot plate 57. In this position, the bearing plate assembly 49 pivots about central pivot roller 52 in response to relative movement of the compensator housing piston rods 45 and 46. This relative movement is shown in FIG. 4.

As material pressure changes occur in one chamber or the other, the compensator housing piston rods 45 and 46 will move in response thereto. This movement will open or close the valve means 35 and 36, thereby correspondingly increasing or decreasing the size of the valve openings as required to permit the desired predetermined proportionate amounts of materials to flow therethrough.

Referring to FIG. 4, it is seen that due to the pivotal mechanical connection brought about by the bearing plate assembly 49, lineal movement of the needle valve 38 away from the valve seat 40 so as to enlarge the valve opening of valve means 36 results in a corresponding and opposite movement of the needle valve 37 toward the valve seat 39 so as to correspondingly decrease the size of the valve opening of valve means 35. In this manner, the size of the valve openings are continually varied to compensate for changes in material pressures brought about by line or conduit pressures, temperature changes, viscosity variations and the like. In this way, the same amount of material flows through each orifice opening if a 1:1 ratio is desired. The desired ratio of one material to another can be selectively varied by changing the relative sizes of the overall valve means at the outset.

In order that the fixed orifice principle be brought into effect, it is important that the volumetric size of the opening between the needle valve cone and the valve seat does not exceed the volumetric cross-sectional area of the orifice plate opening as defined by the valve seat. In essence, this means that the valve cone and valve seat cooperate to maintain a choke control over the respective material passing therethrough. A material starved condition in the chambers or withdrawal of the valve cones too great a distance from their respective valve seats will render the flow compensating metering assembly ineffectual. The openings in the orifice plates would then determine the amounts of material passing therethrough and the size of these fixed openings could not be selectively varied to maintain the proper and constant ratio of material being metered, mixed and dispensed.

It is thus seen that a unique metering, mixing and dispensing apparatus is provided which utilizes a flow compensating metering unit to maintain flow of materials therefrom in any desired constant predetermined proportion or ratio by varying the relative sizes of the valve openings so as to compensate for changes in pressures of the materials being dispensed.

Various other modifications of the invention may be made without departing from the principle thereof. Each of the modifications is to be considered as included in the hereinafter appended claims, unless these claims by their language expressly provide otherwise.

I claim:

1. In a flow compensating metering unit, the combination comprising:
   a. a compensator housing provided with parallel spaced apart material chambers, each of said material chambers provided with a discharge orifice outlet at one end thereof, each of said chambers having material receiving inlet means provided therein;
   b. valve means provided in each of said chambers in operative engagement with said discharge orifice outlets, said valve means mounted on slidable compensator housing piston rod members having end portions which extend outwardly through said compensator housing;
   c. a cylinder mounting plate provided on said compensator housing in a fixed parallel spaced-apart relationship to said end portions of said compensator housing piston rod members, said cylinder mounting plate provided with a pivot plate which extends toward said end portions of compensator housing piston rod members; and
   d. a pivotally mounted connector bearing plate assembly positioned intermediate said pivot plate and said end portions of said compensator housing piston rod members, said bearing plate assembly being in central pivotal engagement with said pivot plate, each end of said bearing plate assembly being in cam operative engagement with said end portions of said compensator housing piston rod members, said pivotally mounted connector bearing plate assembly adapted to provide corresponding adjustment of said valve means in response to movement of said compensator housing piston rod members so as to maintain a constant predetermined ratio of materials being dispensed through said discharge orifice outlets.

2. In the flow compensating metering unit of claim 1 wherein a pair of power shut-off cylinders are provided on said cylinder mounting plate, each of said power shut-off cylinders having a power shut-off cylinder piston rod member extending therefrom in co-axial alignment with one of said compensator housing piston rod members, each of said power shut-off cylinder piston rod members being operatively connected to one of said end portions of said connector bearing plate assembly.

3. In the flow compensating metering unit of claim 1 wherein a pair of material supply pumps are provided, each of which are adapted to deliver material to a corresponding material delivery conduit connected to each of said material receiving inlet means provided in each of said material chambers.

4. In the apparatus of claim 3 wherein a primary surge chamber is provided in each of said material delivery conduits, each of said primary surge chambers adapted to prevent fall-off of pressure in said conduits when said pumps change stroke direction.

5. In the apparatus of claim 3 wherein a back-flow check valve is provided in each of said conduits, each of said back-flow check valves adapted to provide proper direction of flow in said conduits.

6. In the apparatus of claim 3 wherein a secondary surge chamber is provided in each of said conduits, each of said secondary surge chambers adapted to control pressure pulsations in said conduits.

7. In the apparatus of claim 1 wherein a Y-connector conduit is connected to said discharge orifice outlets.

8. In the apparatus of claim 7 wherein mixer means are connected to said Y-connector conduit for mixing materials received from said discharge orifice outlets.

9. In the apparatus of claim 1 wherein said valve means comprise a needle valve and valve seat wherein the volume of the opening therebetween does not exceed the volumetric cross-sectional area of said discharge orifice.

* * * * *